US012633464B2

(12) United States Patent
Kim et al.

(10) Patent No.: US 12,633,464 B2
(45) Date of Patent: May 19, 2026

(54) MULTILAYER ELECTRONIC COMPONENT

(71) Applicant: SAMSUNG ELECTRO-MECHANICS CO., LTD., Suwon-si (KR)

(72) Inventors: Sang Yeop Kim, Suwon-si (KR); Beom Joon Cho, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 119 days.

(21) Appl. No.: 18/667,044

(22) Filed: May 17, 2024

(65) Prior Publication Data

US 2025/0087421 A1     Mar. 13, 2025

(30) Foreign Application Priority Data

Sep. 12, 2023    (KR) ........................ 10-2023-0120954

(51) Int. Cl.
*H01G 4/232* (2006.01)
*H01G 4/30* (2006.01)

(52) U.S. Cl.
CPC .............. *H01G 4/232* (2013.01); *H01G 4/30* (2013.01)

(58) Field of Classification Search
CPC ................................. H01G 4/30; H01G 4/232
See application file for complete search history.

(56) References Cited

U.S. PATENT DOCUMENTS

| | | | | |
|---|---|---|---|---|
| 2010/0123995 A1* | 5/2010 | Otsuka | ................... | H01G 4/228 |
| | | | | 361/308.1 |
| 2012/0262838 A1* | 10/2012 | Otsuka | .................... | H01G 4/30 |
| | | | | 361/306.1 |

(Continued)

FOREIGN PATENT DOCUMENTS

| | | | |
|---|---|---|---|
| JP | 2010-161172 A | | 7/2010 |
| JP | 2012033651 A | * | 2/2012 |

(Continued)

OTHER PUBLICATIONS

European Search Report dated Nov. 18, 2024 in corresponding European Patent Application No. 24177595.6.

*Primary Examiner* — Michael P McFadden
(74) *Attorney, Agent, or Firm* — Morgan, Lewis & Bockius LLP

(57) ABSTRACT

A multilayer electronic component is provided, the multilayer electronic component including: a body including a dielectric layer and an internal electrode alternately disposed with the dielectric layer; an external electrode disposed externally on the body; and a frame terminal including a connection portion disposed on the external electrode and extending in a first direction, a mounting portion spaced apart from the connection portion and extending in a second direction, intersecting the first direction, and a linking portion connecting the connection portion and the mounting portion, wherein the linking portion includes an inward portion extending inwardly from one end of the connection portion in the second direction and an outward portion extending outwardly from one end of the inward portion in the second direction, wherein, when an angle formed by the inward portion and the outward portion is defined as $\theta$, the angle $\theta$ satisfies $10° \leq \theta \leq 150°$.

20 Claims, 10 Drawing Sheets

(56)                    References Cited

U.S. PATENT DOCUMENTS

| | | | |
|---|---|---|---|
| 2016/0086730 A1* | 3/2016 | Park | H05K 3/3426 |
| | | | 361/306.3 |
| 2016/0126015 A1* | 5/2016 | Park | H01G 4/12 |
| | | | 361/301.4 |
| 2022/0263205 A1* | 8/2022 | Ito | H01M 50/209 |

FOREIGN PATENT DOCUMENTS

| | | | |
|---|---|---|---|
| JP | 2012094783 A | * | 5/2012 |
| JP | 2014-072373 A | | 4/2014 |
| KR | 10-1642593 B1 | | 7/2016 |
| KR | 10-2022-0151316 A | | 11/2022 |
| KR | 10-2499464 B1 | | 2/2023 |
| KR | 10-2023-0111732 A | | 7/2023 |

* cited by examiner

FIRST DIRECTION

SECOND DIRECTION

THIRD DIRECTION

FIRST DIRECTION

SECOND DIRECTION

THIRD DIRECTION

FIRST DIRECTION

SECOND DIRECTION

THIRD DIRECTION

I – I'

K1

K2

FIRST DIRECTION

SECOND DIRECTION

THIRD DIRECTION

MULTILAYER ELECTRONIC COMPONENT

CROSS-REFERENCE TO RELATED APPLICATION(S)

This application claims the benefit of priority to Korean Patent Application No. 10-2023-0120954 filed on Sep. 12, 2023 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), a multilayer electronic component, may be a chip-type condenser mounted on the printed circuit boards of any of various electronic products, such as an image display device such as a liquid crystal display (LCD) or a plasma display panel (PDP), a computer, a smartphone or a cellular phone, to charge or discharge electricity therein or therefrom.

The multilayer ceramic capacitor may be used as a component in various electronic devices because the multilayer ceramic capacitor has a small size, implements high capacitance, and may be easily mounted. Recently, with the rapid rise of eco-friendly vehicles and electric vehicles, a power driving system of a vehicle is increasing, and accordingly, demand for multilayer ceramic capacitors required for such a power driving system of a vehicle is also increasing.

As a usage environment for multilayer ceramic capacitors becomes harsher, cracks are likely to occur due to vibrations or mechanical deformation of a substrate on which the multilayer ceramic capacitor is mounted. When a conventional multilayer ceramic capacitor is mounted on the substrate, the body or substrate of the multilayer ceramic capacitor may be in direct contact with each other by a solder, and heat or mechanical deformation generated from the substrate or adjacent components may be directly transmitted to the multilayer ceramic capacitor, so that it may be difficult to secure a high level of reliability.

Accordingly, a method has recently been proposed to prevent thermal and mechanical stress from the substrate from being directly transmitted to the multilayer ceramic capacitor by bonding a metal frame to a side surface of the multilayer ceramic capacitor to secure a distance between the multilayer ceramic capacitor and the substrate on which the multilayer ceramic capacitor is mounted.

However, there is a need for additional research on the multilayer ceramic capacitor having excellent durability such as bending strength, equivalent series resistance (ESR), and acoustic noise within a limited mounting area.

SUMMARY

An aspect of the present disclosure is to provide a multilayer electronic component having excellent durability against heat or mechanical deformation generated by a substrate.

According to an aspect of the present disclosure, a multilayer electronic component is provided, the multilayer electronic component including: a body including a dielectric layer and an internal electrode alternately disposed with the dielectric layer; an external electrode disposed outside the body; and a frame terminal including a connection portion disposed on the external electrode and extending in a first direction, a mounting portion spaced apart from the connection portion and extending in a second direction, intersecting the first direction, and a linking portion connecting the connection portion and the mounting portion, wherein the linking portion includes an inward portion extending inwardly towards the body from one end of the connection portion in the second direction and an outward portion extending outwardly away from the body from one end of the inward portion in the second direction, wherein, when an angle formed by the inward portion and the outward portion is defined as $\theta$, the angle $\theta$ satisfies $10°\leq\theta\leq150°$.

According to another aspect of the present disclosure, a multilayer electronic component is provided, the multilayer electronic component including: a body including a dielectric layer and an internal electrode alternately disposed with the dielectric layer; an external electrode disposed outside the body; and a frame terminal including a connection portion disposed on the external electrode and extending in a first direction, a mounting portion spaced apart from the connection portion and extending in a second direction, intersecting the first direction, and a linking portion connecting the connection portion and the mounting portion, wherein the linking portion includes an inner protrusion portion protruding inwardly towards the body in the second direction, and an outer protrusion portion connected to the inner protrusion portion, and protruding outwardly away from the body in the second direction.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Figure 1:
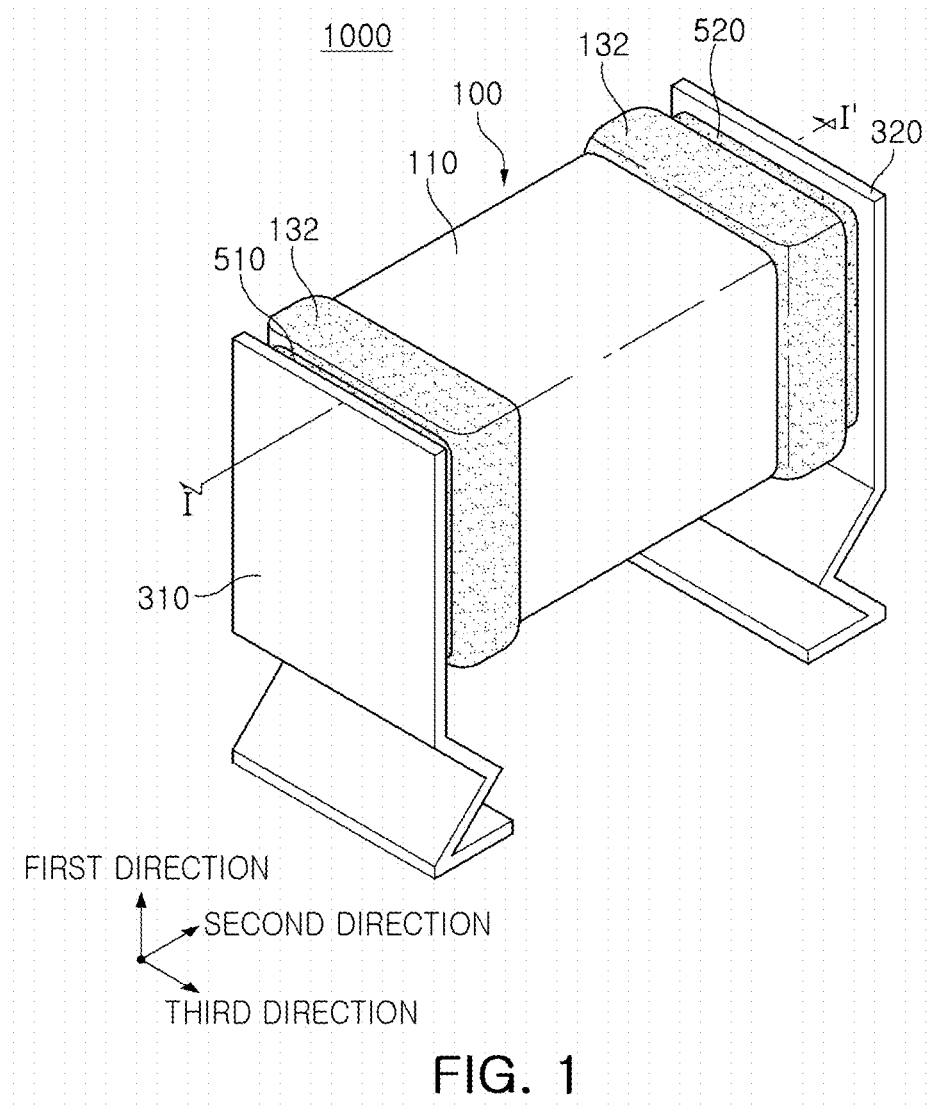
FIG. 1 is a perspective view schematically illustrating a multilayer electronic component according to a first embodiment of the present disclosure.

Hereinafter, embodiments of the present disclosure will be described as follows with reference to the attached drawings. The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of elements in the drawings may be exaggerated for clear description, and elements indicated by the same reference numeral are the same elements in the drawings.

In the drawings, irrelevant descriptions will be omitted to clearly describe the present disclosure, and to clearly express a plurality of layers and areas, thicknesses may be magnified. The same elements having the same function within the scope of the same concept will be described with use of the same reference numerals. Throughout the specification, when a component is referred to as "comprise" or "comprising," it means that it may further include other components as well, rather than excluding other components, unless specifically stated otherwise.

In the drawings, a first direction may be defined as a thickness (T) direction, a second direction may be defined as a length (L) direction, and a third direction may be defined as a width (W) direction.

FIRST EMBODIMENT

FIG. 1 is a perspective view schematically illustrating a multilayer electronic component according to a first embodiment of the present disclosure.

Figure 2:
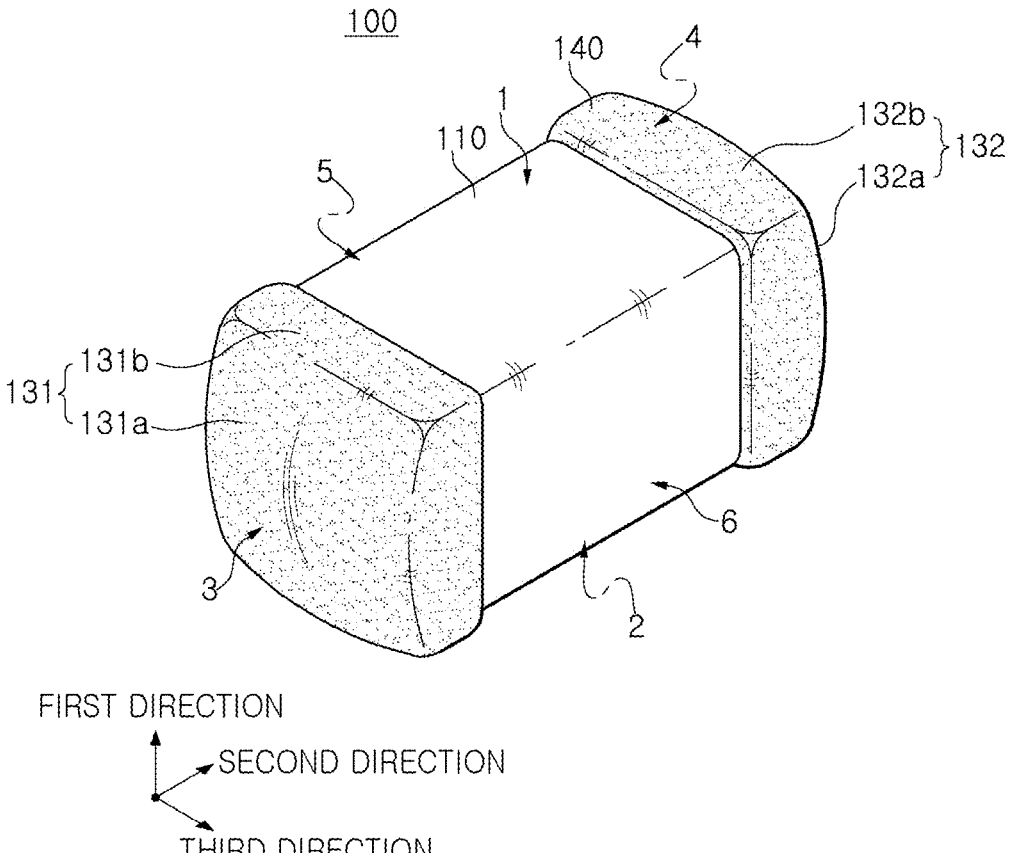
FIG. 2 is a perspective view schematically illustrating the multilayer capacitor of FIG. 1.

FIG. 2 is a perspective view schematically illustrating the multilayer capacitor of FIG. 1.

Figure 3:
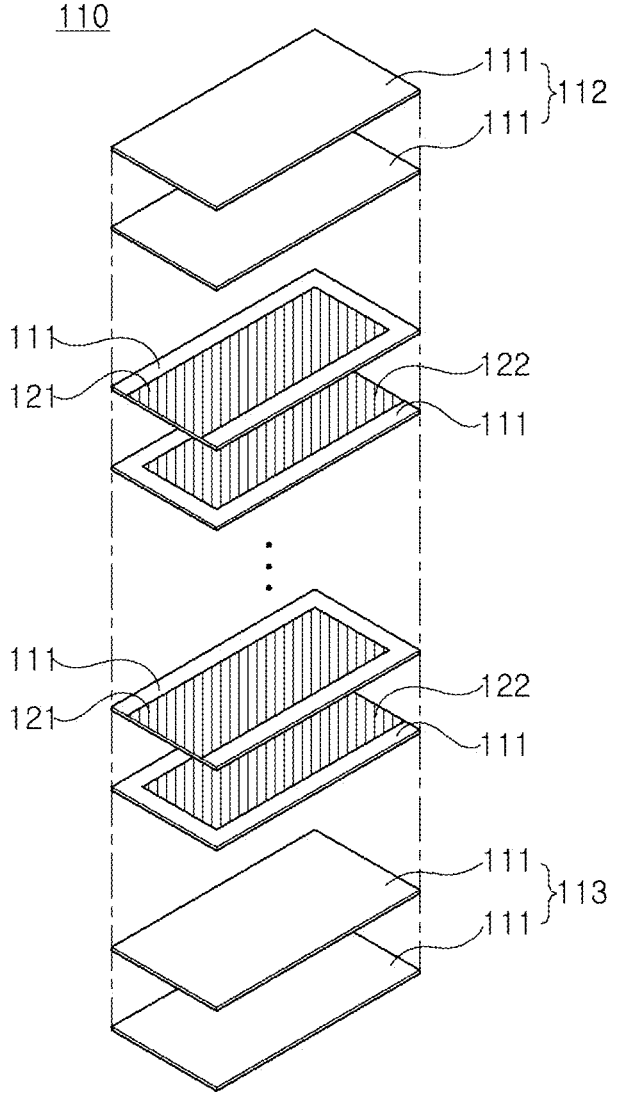
FIG. 3 is an exploded perspective view schematically illustrating the body of FIG. 2 in a disassembled state.

FIG. 3 is an exploded perspective view schematically illustrating the body of FIG. 2 in a disassembled state.

Figure 4:
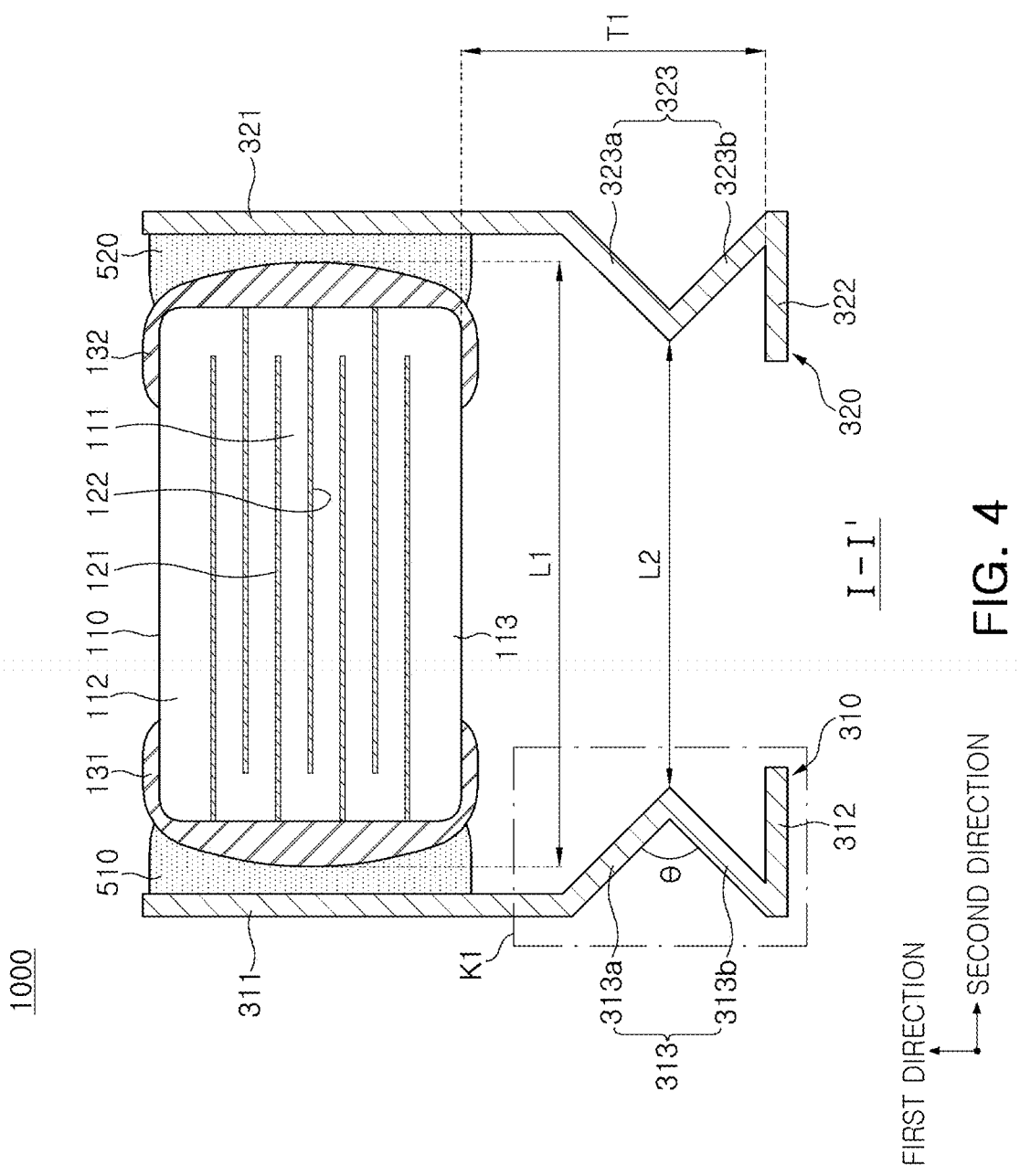
FIG. 4 is a cross-sectional view taken along line I-I' of FIG. 1.

FIG. 4 is a cross-sectional view taken along line I-I' of FIG. 1.

Figure 5:
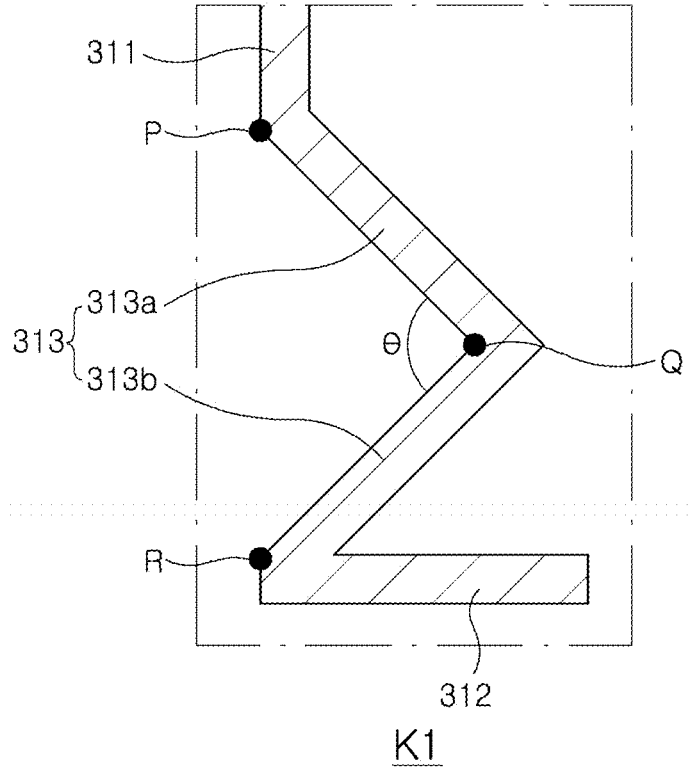
FIG. 5 is an enlarged view of region "K1" of FIG. 4.

FIG. 5 is an enlarged view of region "K1" of FIG. 4.

Referring to FIGS. 1 to 5, a multilayer electronic component according to a first embodiment of the present disclosure may include a multilayer capacitor 100 and frame terminals 310 and 320. The multilayer capacitor 100 may include a body 110 and external electrodes 131 and 132 disposed externally on the body 110.

The body 110 is not limited to a particular shape, and may have a hexahedral shape or a shape similar to the hexahedral shape, as illustrated. The body 110 may not have a shape of the hexahedron having perfectly straight lines because a ceramic powder particle included in the body 110 may contract during a sintering process or an edge thereof may be polished. However, the body 110 may have a substantially hexahedral shape.

The body 110 may have first and second surfaces 1 and 2 opposing each other in a first direction, third and fourth surfaces 3 and 4 connected to the first and second surfaces 1 and 2 and opposing each other in a second direction, and fifth and sixth surfaces 5 and 6 connected to the first and second surfaces 1 and 2, connected to the first to fourth surfaces 1, 2, 3 and 4, and opposing each other in a third direction.

The body 110 may include a dielectric 111 and internal electrodes 121 and 122 alternately disposed with the dielectric layer 111. The plurality of dielectric layers 111 forming the body 110 may be in a sintered state, and a boundary between the adjacent dielectric layers 111 may be integrated with each other such that the boundary may not be readily apparent without a scanning electron microscope (SEM).

The dielectric layer 111 may be formed by preparing a ceramic slurry containing ceramic powder, an organic solvent, and a binder, applying the slurry on a carrier film and drying the same to prepare a ceramic green sheet, and then sintering the ceramic green sheet. The ceramic powder is not particularly limited as long as sufficient capacitance may be obtained, but for example, a barium titanate-based material, a lead composite perovskite-based material, or a strontium titanate-based material may be used. The ceramic powder may be, for example, $BaTiO_3$, or $(Ba_{1-x}Ca_x)TiO_3$ ($0<x<1$), $Ba(Ti_{1-y}Ca_y)O_3$ ($0<y<1$), $(Ba_{1-x}Ca_x)(Ti_{1-y}Zr_y)O_3$ ($0<x<1$, $0<y<1$), $Ba(Ti_{1-y}Zr_y)O_3$ ($0<y<1$), or the like, in which calcium (Ca), zirconium (Zr) or the like is partially dissolved in $BaTiO_3$.

An average thickness of the dielectric layers 111 does not need to be specifically limited, but the average thickness of at least one of the dielectric layers 111 may be 0.1 μm or more and 10 μm or less. In addition, the average thickness of the dielectric layer 111 may be arbitrarily set depending on desired characteristics or purposes. For example, in the case of high-voltage electronic components, the average thickness of at least one of the dielectric layers 111 may be 0.5 μm or more, and to implement capacitance of the multilayer electronic component, the average thickness of at least one of the dielectric layers 111 may be less than 2.8 μm.

The internal electrodes 121 and 122 may be alternately disposed with the dielectric layer 111, and for example, the first internal electrode 121 and the second internal electrode 122, which are a pair of electrodes having different polarities, may be disposed to face each other with the dielectric layer 111 interposed therebetween. The first internal electrode 121 and the second internal electrode 122 may be electrically separated from each other by the dielectric layer 111 disposed therebetween.

The first internal electrode 121 may be disposed to be spaced apart from the fourth surface 4 and connected to the first external electrode 131 on the third surface 3. In addition, the second internal electrode 122 may be disposed to be spaced apart from the third surface 3 and connected to the second external electrode 132 on the fourth surface 4.

The conductive metal included in the internal electrodes 121 and 122 may be one or more of Ni, Cu, Pd, Ag, Au, Pt, Sn, W, Ti, and alloys thereof, and the internal electrodes 121 and 122 may include, for example, Ni as a main component, but the present disclosure is not limited thereto.

The internal electrodes 121 and 122 may be formed by applying a conductive paste for internal electrodes containing a conductive metal to a predetermined thickness on a ceramic green sheet and sintering the same. The printing method for the conductive paste for internal electrodes may be screen printing or gravure printing, but the present disclosure is not limited thereto.

An average thickness of the internal electrodes 121 and 122 does not need to be particularly limited, but may be, for example, 0.05 μm or more and 3.0 μm or less. In addition, the average thickness of the internal electrodes 121 and 122 may be arbitrarily set depending on desired characteristics or purposes. For example, in the case of high-voltage electronic components, the average thickness of at least one of the internal electrodes 121 and 122 may be 0.1 μm or more, and to implement capacitance of the multilayer electronic component, the average thickness of at least one of the internal electrodes 121 and 122 may be less than 1.0 μm.

The average thickness of the dielectric layer 111 and the average thickness of the internal electrodes 121 and 122 mean sizes of the dielectric layer 111 and the internal electrodes 121 and 122 in the first direction, respectively. The average thickness of the dielectric layer 111 and the average thickness of the internal electrodes 121 and 122 may be measured by scanning cross-sections of the body 110 in the first and second directions with a scanning electron microscope (SEM) at a 10,000 magnification. More specifically, the average thickness of the dielectric layer 111 may be obtained by measuring the thickness at multiple points of one dielectric layer 111, for example, 30 points at equal intervals in the second direction. In addition, the average thickness of the internal electrodes 121 and 122 may be obtained by measuring the thickness at multiple points of one internal electrode 121 and 122, for example, 30 points at equal intervals in the second direction. The 30 equally spaced points may be designated in a capacitance forming portion, to be described later. Meanwhile, when the average values are measured by extending this average value measurements to 10 dielectric layers 111 and 10 internal electrodes 121 and 122 respectively, the average thickness of the dielectric layer 111 and the average thickness of the internal electrodes 121 and 122 may be further generalized.

The body 110 may include a capacitance forming portion disposed inside the body 110 and including first and second internal electrodes 121 and 122 alternately disposed with the dielectric layer 111 interposed therebetween to form capacitance and a first cover portion 112 and a second cover portion 113 respectively disposed on both surfaces of the capacitance forming portion opposing each other in the first direction. The cover portions 112 and 113 may basically serve to prevent damage to the internal electrodes due to physical or chemical stress. The cover portions 112 and 113 may have the same configuration as the dielectric layer 111, except that the cover portions 112 and 113 do not include internal electrodes.

A thickness of the cover portions 112 and 113 is not particularly limited. However, in order to implement miniaturization and high capacitance of the multilayer electronic component, an average thickness of the cover portions 112 and 113 may be 100 μm or less, 50 μm or less, or 20 μm or less. Here, the average thickness of the cover portions 112 and 113 may mean an average thickness of each of the first cover portion 112 and the second cover portion 113. The average thickness of the cover portions 112 and 113 may mean an average size of the cover portions 112 and 113 in the first direction, and may be a size obtained by averaging sizes thereof measured at five points at equal intervals in the cross-section of the body in the first and second directions.

The external electrodes 131 and 132 may be disposed outside the body 110 and be connected to the internal electrodes 121 and 122. Specifically, the external electrodes 131 and 132 may include first and second external electrodes 131 and 132 respectively disposed on both surfaces of the body 110 opposing each other in the second direction. The first external electrode 131 may be connected to the first internal electrode 121, and the second external electrode 132 may be connected to the second internal electrode 122.

The first external electrode 131 may include a first head portion 131a disposed on the third surface 3 and connected to the first internal electrode 121 and a first band portion 131b extending from the first head portion 131a onto portions of the first, second, fifth, and sixth surfaces 1, 2, 5, and 6 of the body 110. The second external electrode 132 may include a second head portion 132a disposed on the fourth surface 4 and connected to the second internal electrode 122 and a second band portion 132b extending from the second head portion 132a onto portions of the first, second, fifth, and sixth surfaces 1, 2, 5, and 6 of the body 110.

The external electrodes 131 and 132 may include a base electrode and a terminal electrode disposed on the base electrode. That is, the first external electrode 131 may include a first base electrode in contact with the third surface 3 and a first terminal electrode disposed on the first base electrode. The second external electrode 132 may include a second base electrode in contact with the fourth surface 4 and a second terminal electrode disposed on the second base electrode.

The base electrode may include metal and glass. The metal included in the base electrode may serve to secure electrical connectivity, and the glass may serve to improve bonding strength with the body 110.

The metal included in the base electrode may be formed using any material as long as it has electrical conductivity, and the specific material may be determined by considering electrical properties, structural stability, and the like. For example, the metal included in the base electrode may be one or more selected from the group consisting of Ni, Cu, Pd, Ag, Au, Pt, Sn, W, Ti, and alloys thereof, and the metal included in the base electrode may include Cu as a main component, but the present disclosure is not limited thereto.

Meanwhile, the base electrode may be composed of a single layer including metal and glass, but the present disclosure is not limited thereto, and the base electrode may have a multi-layer structure.

For example, the base electrode may include a first layer including metal and glass, and a second layer disposed on the first layer and including metal and resin. As the base electrode includes a second layer, the bending strength of the multilayer electronic component 1000 can be improved.

The metal included in the second layer is not particularly limited, and may include one or more selected from the group consisting of Ni, Cu, Pd, Ag, Au, Pt, Sn, W, Ti, and alloys thereof. The metal included in the second layer may include, for example, one or more of spherical particles and flake-shaped particles.

The resin included in the second layer may serve to secure bonding properties and absorb shocks. The resin is not particularly limited as long as it has bonding properties and shock absorption properties and may be mixed with metal powder to make a paste. For example, the resin may include one or more selected from epoxy resin, acrylic resin, ethyl cellulose, and the like.

The terminal electrode may improve mounting characteristics. The type of the terminal electrode is not particularly limited, and may be a plating layer including Ni, Sn, Pd, and/or an alloy including the same, and may be formed of a plurality of layers. The terminal electrode may be, for example, a Ni plating layer or a Sn plating layer, or may be formed by sequentially forming a Ni plating layer and a Sn plating layer. In addition, the terminal electrode may include a plurality of Ni plating layers and/or a plurality of Sn plating layers.

In the drawings, a structure in which the multilayer electronic component 1000 has two external electrodes 131 and 132 is illustrated, but the structure is not limited thereto, and the number and shape of the external electrodes 131 and 132 may be changed depending on the shape of the internal electrodes 121 and 122 or other purposes.

The size of the multilayer capacitor 100 does not need to be particularly limited. For example, the maximum size of the multilayer capacitor 100 in the second direction may be 0.1 mm to 4.5 mm, and the maximum size of the multilayer capacitor 100 in the third direction may be 0.05 mm to 3.2 mm, and the maximum size of the multilayer capacitor 100 in the first direction may be 0.05 mm to 2.5 mm.

According to the first embodiment of the present disclosure, the frame terminals 310 and 320 may be disposed outside the multilayer capacitor 100 in the second direction.

Specifically, the frame terminals 310 and 320 may include a first frame terminal 310 connected to the first external electrode 131 and a second frame terminal 320 connected to the second external electrode 132.

The frame terminals 310 and 320 may include Ni, Fe, Cu, Ag, Cr, or alloys thereof. For example, the frame terminals 310 and 320 may be Fe—42Ni alloy or Fe—18Cr alloy. The thickness of the frame terminals 310 and 320 does not need to be particularly limited, but may be, for example, 0.05 mm to 0.5 mm.

The frame terminals 310 and 320 may include connection portions 311 and 321 disposed on the external electrodes 131 and 132 and extending in the first direction, mounting portions 312 and 322 spaced apart from the connection portions 311 and 321 and extending in a second direction, intersecting the first direction, and linking portions 313 and 323 connecting the connection portions 311 and 321 and the mounting portions 312 and 322. That is, the first frame terminal 310 may include a first connection portion 311 disposed on the first external electrode 131 and extending in the first direction, a first mounting portion 312 spaced apart from the first connection portion 311 and extending in the second direction, and a first linking portion 313 connecting the first connection portion 311 and the first mounting portion 312. The second frame terminal 320 may include a second connection portion 321 disposed on the second external electrode 132 and extending in the first direction, a second mounting portion 322 spaced apart from the second connection portion 321 and extending in the second direction, and a second linking portion 323 connecting the second connection portion 321 and the second mounting portion 322.

The frame terminals 310 and 320 basically secure the distance between the multilayer capacitor 100 and the substrate to prevent heat or vibration generated from the substrate from being directly transmitted to the multilayer capacitor 100, thereby improving thermal reliability and mechanical durability of the multilayer electronic component 1000.

The connection portions 311 and 321 may be connected to the head portions 131a and 132a of the external electrodes 131 and 132, thereby serving to electrically connect the external electrodes 131 and 132 and the frame terminals 310 and 320.

In an embodiment, the multilayer electronic component 1000 may include conductive adhesive portions 510 and 520 disposed between the external electrodes 131 and 132 and the frame terminals 310 and 320. Specifically, a first conductive adhesive portion 510 may be disposed between the first external electrode 131 and the first frame terminal 310, and a second conductive adhesive portion 520 may be disposed between the second external electrode 132 and the second frame terminal 320. The conductive adhesive portions 510 and 520 may serve to improve electrical and physical connectivity between the external electrodes 131 and 132 and the frame terminals 310 and 320.

The first and second conductive adhesive portions 510 and 520 may include a conductive adhesive such as solder or a conductive resin paste. The solder may include, for example, Sn—Sb-based, Sn—Ag—Cu-based, Sn—Cu-based, and/or Sn—Bi-based solder.

The linking portions 313 and 323 may include inward portions 313a and 323a extending inwardly in a second direction from one end of the connection portions 311 and 321 and outward portions 313b and 323b extending outwardly in the second direction from one end of the inward portions 313a and 323a. That is, the first linking portion 313 may include a first inward portion 313a extending inwardly in the second direction from one end of the first connection portion 311 and a first outward portion 313b extending outwardly in the second direction from one end of the first inward portion 313a, and the second linking portion 323 may include a second inward portion 323a extending inwardly in the second direction from one end of the second connection portion 321 and a second outward portion 323b extending outwardly in the second direction from one end of the second inward portion 323a. That is, the linking portions 313 and 323 may have a shape bent inwardly in the second direction, thereby improving the bending strength of the multilayer electronic component 1000.

According to the first embodiment of the present disclosure, when an angle formed by the inward portions 313a and 323a and the outward portions 313b and 323b is defined as $\theta$, $10° \leq \theta \leq 150°$ can be satisfied. When the angle $\theta$ is greater than 150°, the effect of improving bending strength of the present disclosure may be minimal. In addition, when the angle $\theta$ is less than 10°, a distance between the first linking portion 313 and the second linking portion 323 is reduced, so that a side effect in which an ESR or acoustic noise of the multilayer electronic component 1000 increases excessively may occur. Meanwhile, from the viewpoint of securing the electrical characteristics of the multilayer electronic component 1000, the angle $\theta$ is preferably to satisfy $60° \leq \theta \leq 150°$, but the present disclosure is not limited thereto.

As shown in FIG. 5, a first bending point P may be present between the first connection portion 311 and the first inward portion 313a among the outer surfaces of the first frame terminal 310, a second bending point Q may be present between the first inward portion 313a and the first outward portion 313b, and a third bending point R may be present between the first outward portion 313b and the first mounting portion 312. For example, the angle $\theta$ may mean a smaller angle of the two angles formed by a straight line obtained by connecting the first bending point P and the second bending point Q and a straight line obtained by connecting the second bending point Q and the third bending point R.

In an embodiment, when a maximum distance between the outer surface of the first external electrode 131 and the outer surface of the second external electrode 132 is defined as L1, and a minimum distance between the first linking portion 313 of the first frame terminal 310 and the second linking portion 323 of the second frame terminal 320 in the second direction is defined as L2, the maximum distance L1 and the minimum distance L2 may satisfy $L2 \geq 0.1 \times L1$. When the minimum distance L2 is less than $0.1 \times L1$, the distance between the first frame terminal 310 and the second frame terminal 320 becomes too close, and there is a risk of arc discharge occurs. An upper limit of the minimum distance L2 does not need to be specifically limited, and may be, for example, $L2 < L1$.

For example, the mounting portions 312 and 322 may serve as a terminal when mounted on a substrate, and may be bonded to a land pattern of the substrate by solder or the like. Meanwhile, in order to secure the distance between the multilayer capacitor 100 and the substrate when the multilayer electronic component 1000 is mounted on the substrate, the maximum size of the body 110 in the first direction is defined as T, and the minimum size between the body 110 and the mounting portions 312 and 322 is defined as T1, it may be preferable to satisfy $0.2 \times T \leq T1 \leq T$.

It is enough for the mounting portions 312 and 322 to extend in the second and/or third directions so as to be parallel to the mounting surface in order to serve as a terminal when mounted on a substrate. However, in an embodiment, the mounting portions 312 and 322 may extend inwardly in the second direction from one end of the linking portions 313 and 323. The mounting portions 312 and 322 may extend inwardly from one end of the linking portions 313 and 323 in the second direction, thereby reducing the mounting area, as compared to a structure in which the mounting portions 312 and 322 extend outwardly in the second direction therefrom.

EXPERIMENTAL EXAMPLE

Bending Strength Evaluation

A multilayer capacitor having a size in a second direction of 3.2 mm and a size in a third direction of 2.5 mm, satisfying X7R standards, having a capacity of 4.7 μF, and a rated voltage of 50 V was prepared. Sample chips Nos. 1 to 6, forming a frame terminal connected to an external electrode of the multilayer capacitor, and having different angles θ between the inward and outward portions of the linking portion were prepared.

Next, a measuring plate was prepared to evaluate bending strength. The measuring plate was supported by two support portions, spaced apart from each other, and a distance between the two support portions was 9.0 cm. Thereafter, sample chips of sample Nos. 1 to 6 were mounted on a substrate and then the substrate on which the sample chip was mounted was moved toward a center portion between the two support portions at a speed of 1 m/s. Thereafter, the substrate was moved until a crack occurred in the sample chips, and when a crack occurred in the sample chips, a distance in which the substrate was moved as compared to an initial position of the center portion was measured. Meanwhile, on the board, 30 sample chips each of sample Nos. 1 to 6 were mounted horizontally (mounting surface and internal electrode were parallel) on the substrate, and 30 sample chips thereof were vertically mounted (mounting surface and internal electrode were perpendicular) to perform bending strength evaluation. An average value, maximum value, minimum value, and standard deviation of the distance in which the substrate was moved as compared to the initial position of the center portion were described in Table 1 below.

TABLE 1

| Sample No. | 1 | 2 | 3 | 4 | 5 | 6 |
|---|---|---|---|---|---|---|
| θ | 5° | 10° | 60° | 90° | 150° | 180° |
| Average value (mm) | 9.72 | 9.69 | 8.64 | 7.91 | 7.30 | 6.42 |
| Maximum value (mm) | 11.31 | 11.20 | 10.32 | 9.42 | 8.89 | 8.22 |
| Minimum value (mm) | 8.45 | 8.40 | 6.70 | 6.07 | 6.04 | 5.19 |
| Standard deviation (mm) | 0.71 | 0.73 | 0.88 | 1.03 | 0.72 | 0.81 |

Referring to the minimum value of bending strength in Table 1 above, it can be confirmed that, in sample Nos. 1 to 5, the bending strength was guaranteed at 6 mm or more when evaluating bending strength. As the angle θ increases, the bending strength decreases, and it can be confirmed that, in a sample No. 6, the bending strength was not guaranteed at 6 mm or more.

ESR Evaluation

An ESR of sample Nos. 1 to 6 was measured using an LCR meter (E49980A). The ESR was measured at a frequency of 500 kHz using an SMD fixture type probe for a total of 60 samples per sample number, and an average, maximum, and minimum value thereof were described in Table 2 below.

TABLE 2

| Sample No. | 1 | 2 | 3 | 4 | 5 | 6 |
|---|---|---|---|---|---|---|
| θ | 5° | 10° | 60° | 90° | 150° | 180° |
| Average value (mΩ) | 10.50 | 8.09 | 7.17 | 6.03 | 5.27 | 3.45 |
| Maximum value (mΩ) | 11.74 | 9.27 | 8.17 | 7.30 | 7.67 | 4.85 |
| Minimum value (mΩ) | 8.94 | 6.17 | 5.81 | 4.92 | 4.12 | 2.17 |

Referring to Table 2, it can be confirmed that the ESR decreases as the angle θ increases. This is because the narrower the angle θ, the shorter a distance between the first frame terminal and the second frame terminal. Meanwhile, it can be confirmed that the ESR of Sample No. 2 to 6 is satisfied, but an average value of the ESR of Sample No. 1 is 10.50 mΩ, which exceeds the ESR value of 10 mΩ, which is the commonly required ESR value of the multilayer capacitor.

Acoustic Noise Evaluation

To measure acoustic noise, samples of sample Nos, 1 to 6 were mounted on a substrate, and then the substrate was mounted on a jig for measurement. Then, a DC voltage and voltage fluctuations were applied to the sample mounted on the jig for measurement using a DC power supply and signal generator. Thereafter, acoustic noise was measured using a microphone installed directly above the substrate.

Acoustic noise was measured for a total of 60 samples for each sample number, and an average, maximum value, and minimum value of the acoustic noise measurement values were calculated and described in Table 3 below.

TABLE 3

| Sample No. | 1 | 2 | 3 | 4 | 5 | 6 |
|---|---|---|---|---|---|---|
| θ | 5° | 10° | 60° | 90° | 150° | 180° |
| Average value (dB) | 39.0 | 34.3 | 29.7 | 27.2 | 24.8 | 20.3 |
| Maximum value (dB) | 41.1 | 36.7 | 31.9 | 29.1 | 27.5 | 21.7 |
| Minimum value(dB) | 36.4 | 30.8 | 27.5 | 25.2 | 22.8 | 19.4 |

Referring to Table 3, it can be confirmed that as the angle θ increases, acoustic noise decreases. Meanwhile, the average value of the acoustic noise of Sample No. 2 to 6 is satisfied, but the average value of the acoustic noise of Sample No. 1 is 39.0 dB, which exceeds the commonly required acoustic noise value of the multilayer capacitor of 38.0 dB.

On the other hand, it can be confirmed that the minimum value of the acoustic noise measurement value for Sample Nos. 3 to 6 does not exceed 30.0 dB, and from the viewpoint of reducing acoustic noise, it can be confirmed that the angle θ is preferably 10° or more, and is more preferably 60° or more.

SECOND EMBODIMENT

Figure 6:
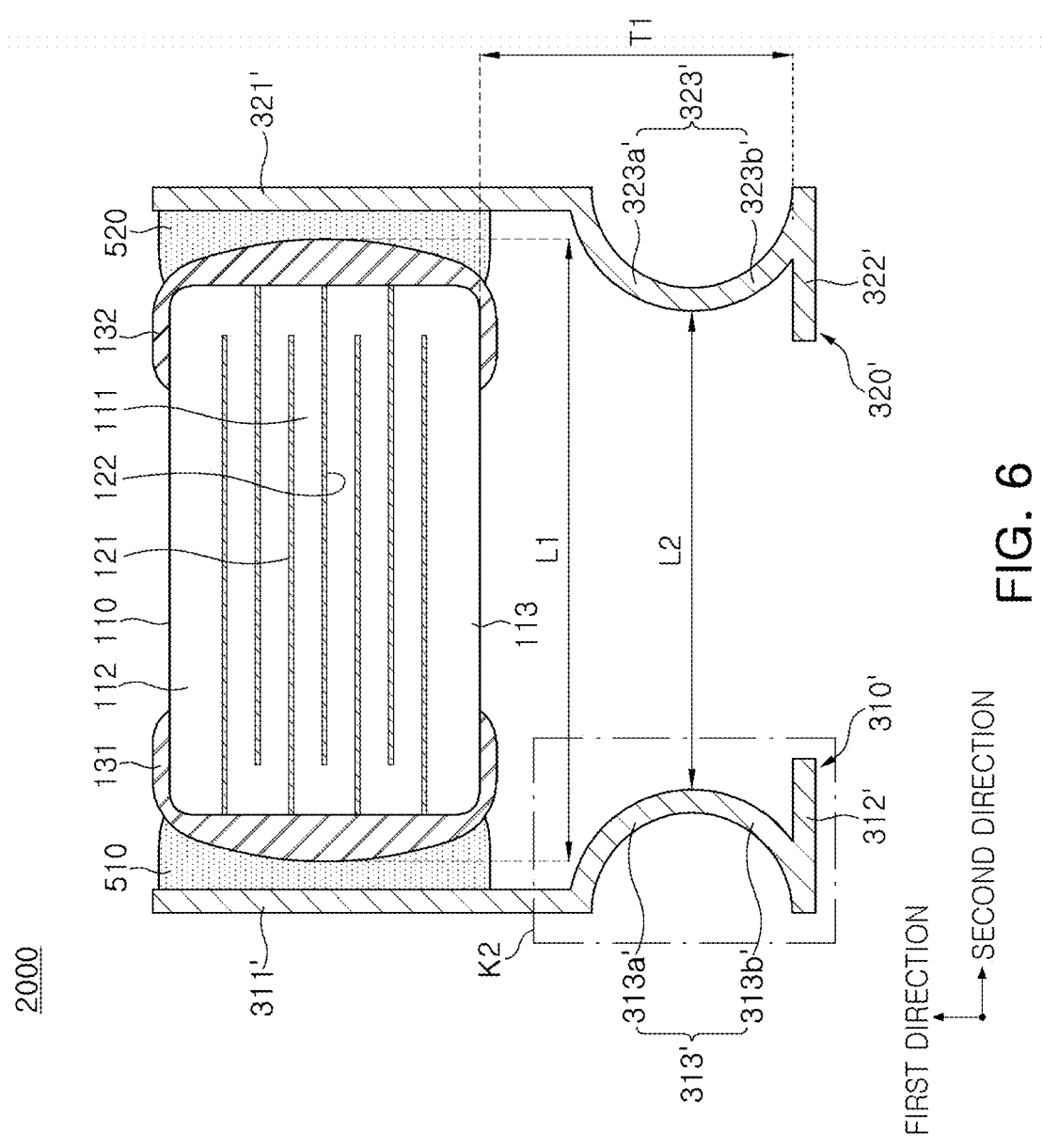
FIG. 6 is a modified example of FIG. 4, and is a cross-sectional view schematically illustrating a multilayer electronic component according to a second embodiment of the present disclosure.
Figure 7:
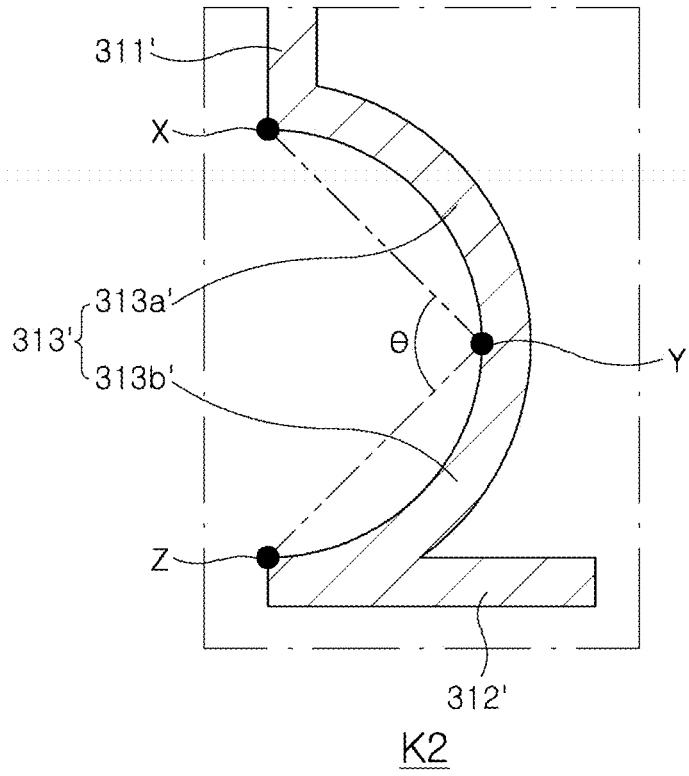
FIG. 7 is an enlarged view of region "K2" of FIG. 6.

FIG. 6 is a modified example of FIG. 4, and is a cross-sectional view schematically illustrating a multilayer electronic component according to a second embodiment of the present disclosure. FIG. 7 is an enlarged view of region K2 in FIG. 6.

Hereinafter, a multilayer electronic component 2000 according to a second embodiment of the present disclosure will be described with reference to FIGS. 6 and 7. Among the components of the multilayer electronic component 3000 according to the second embodiment, similar components to those of the first embodiment have the same reference numerals, and descriptions overlapping with the above-described first embodiment of the present disclosure are omitted.

According to the third embodiment of the present disclosure, frame terminals 310' and 320' may be disposed outside the multilayer capacitor 100 in the second direction. Specifically, the frame terminals 310' and 320' may include a first frame terminal 310' connected to the first external electrode 131 and a second frame terminal 320' connected to the second external electrode 132.

The frame terminals 310' and 320' may include connection portions 311' and 321' disposed on the external electrodes 131 and 132 and extending in the first direction, mounting portions 312' and 322' spaced apart from the connection portions 311' and 321' and extending in a second direction, intersecting the first direction, and linking portions 313' and 323' connecting the connection portions 311' and 321' and the mounting portions 312' and 322'. That is, the first frame terminal 310' may include a first connection portion 311' disposed on the first external electrode 131 and extending in the first direction, a first mounting portion 312' spaced apart from the first connection portion 311' and extending in the second direction, and a first linking portion 313' connecting the first connection portion 311' and the first mounting portion 312'. The second frame terminal 320' may include a second connection portion 321' disposed on the second external electrode 132 and extending in the first direction, a second mounting portion 322' spaced apart from the second connection portion 321' and extending in the second direction, and a second linking portion 323' connecting the second connection portion 321' and the second mounting portion 322'.

The linking portions 313' and 323' may include inward portions 313a' and 323a' extending inwardly in the second direction from one end of the connection portions 311' and 321' and outward portions 313b' and 323b' extending outwardly in the second direction from one end of the inward portions 313a' and 323a'.

According to the second embodiment of the present disclosure, when the multilayer electronic component 1000 is viewed in the third direction, the inward portions 313a' and 323a' and the outward portions 313b' and 323b' may have a convex curved surface inwardly in the second direction. That is, when viewed in the third direction, the linking portions 313' and 323' may have a convex shape inwardly in the second direction, for example, may have a semicircular arc shape. Since the inward portions 313a' and 323a' and the outward portions 313b' and 323b' have a convex curved surface inwardly in the second direction, so that the bending strength improvement effect of the present disclosure may be more significant.

Likewise, in the multilayer electronic component 2000 according to the second embodiment, the angle θ formed by the inward portions 313a' and 323a' and the outward portions 313b' and 323b' may satisfy 10°≤θ≤150°. In addition, the angle θ formed by the inward portions 313a' and 323a' and the outward portions 313b' and 323b' may satisfy 60°≤θ≤150°.

Referring to FIG. 7, among outer surfaces of the first frame terminal 310', a first bending point X may exist between the first connection portion 311' and the first inward portion 313a', and a third bending point Z may exist between the first outward portion 313b' and the first mounting portion 312'. In addition, among the outer surfaces of the first frame terminal 310', there may be a second point Y at which a distance in the second direction from a straight line obtained by connecting the first bending point X and the third bending point Z is maximum. For example, the angle θ may mean an angle, which is smaller of the two angles formed by the straight line obtained by connecting the first bending point X and the second point Y and the straight line obtained by connecting the second point Y and the third bending point Z.

THIRD EMBODIMENT

Figure 8:
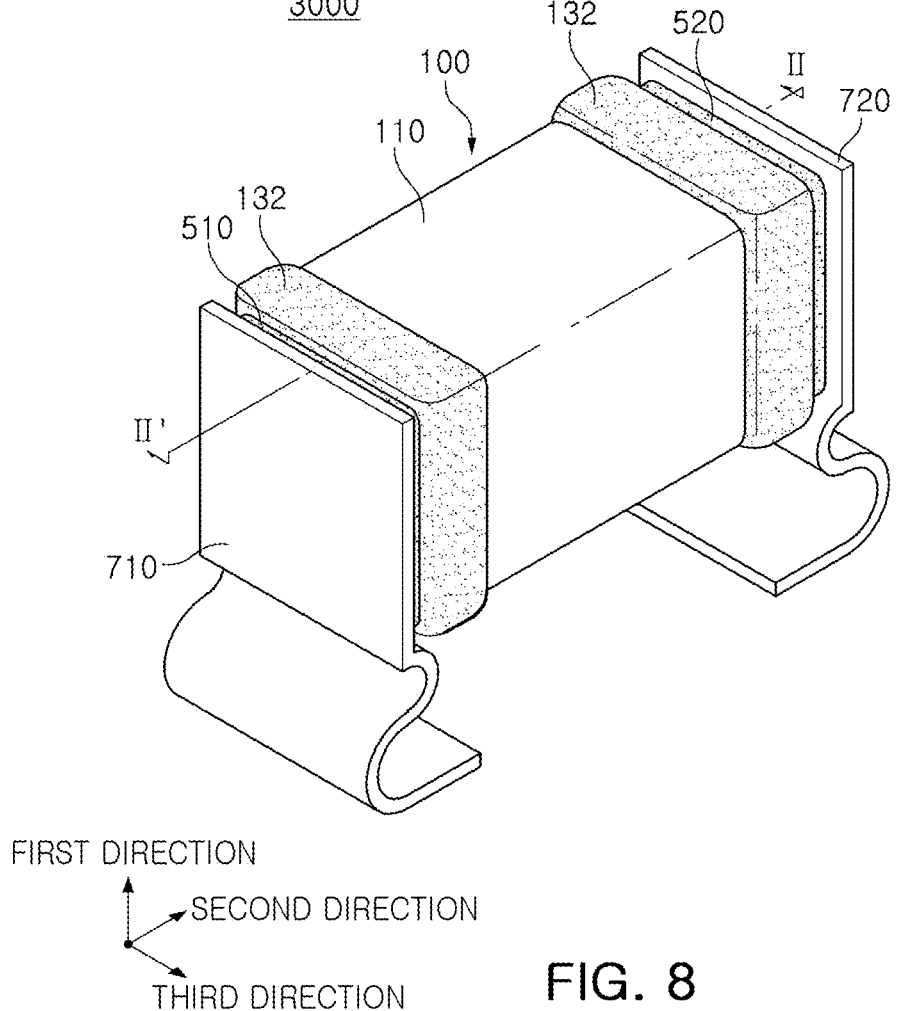
FIG. 8 is a perspective view schematically illustrating a multilayer electronic component according to a third embodiment of the present disclosure.
Figure 9:
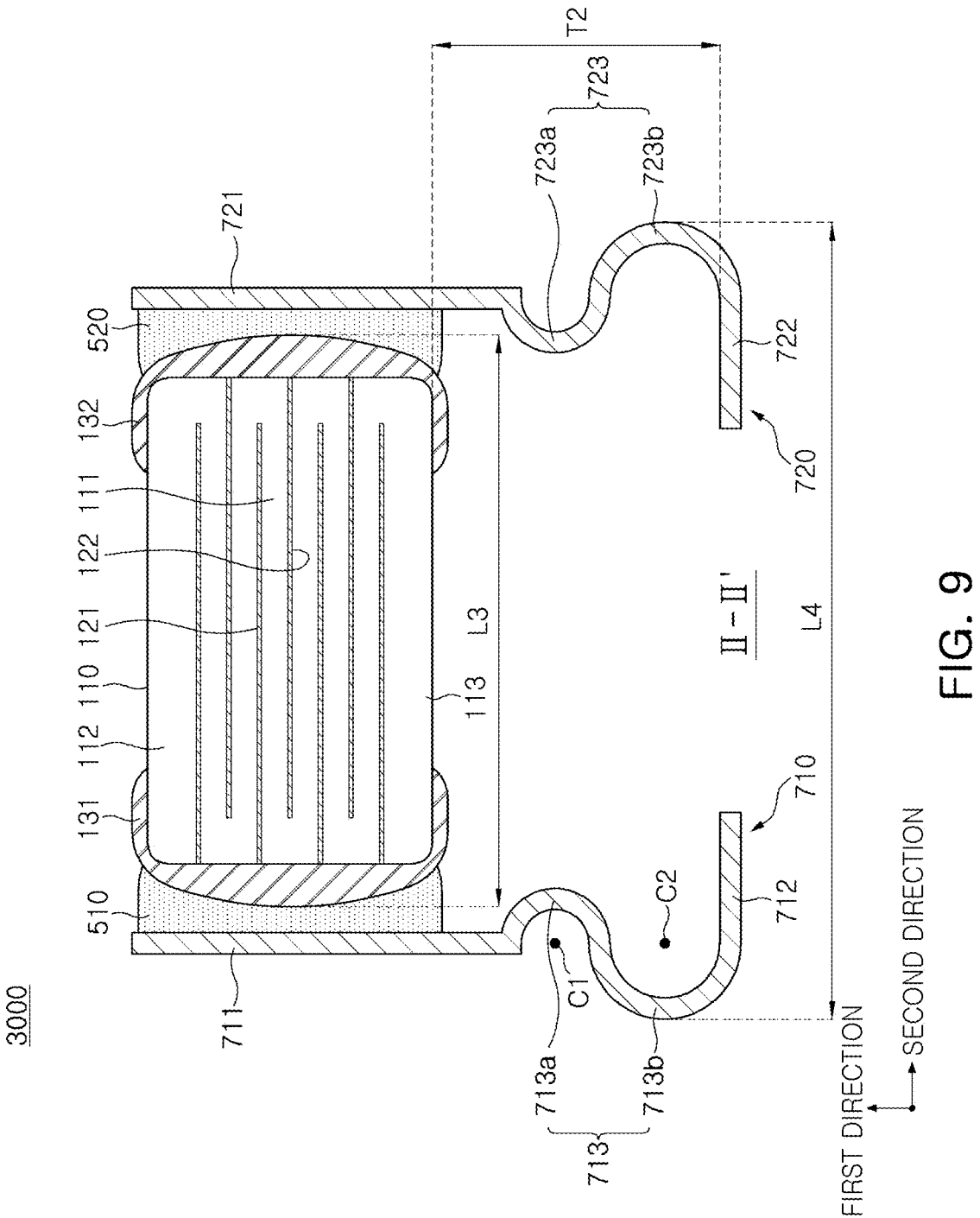
FIG. 9 is a cross-sectional view taken along line II-II' of FIG. 8.

FIG. 8 is a perspective view schematically illustrating a multilayer electronic component 3000 according to a third embodiment of the present disclosure. FIG. 9 is a cross-sectional view schematically illustrating a cross-section taken along line II-II' of FIG. 8.

Hereinafter, a multilayer electronic component 3000 according to a third embodiment of the present disclosure will be described with reference to FIGS. 8 and 9. Among the components of the multilayer electronic component 3000 according to the third embodiment, similar components to those of the first embodiment have the same reference numerals, and descriptions overlapping the above-described first embodiment of the present disclosure are omitted.

According to the third embodiment of the present disclosure, frame terminals 710 and 720 may be disposed outside the multilayer capacitor 100 in the second direction. Specifically, the frame terminals 710 and 720 may include a first frame terminal 710 connected to the first external electrode 131 and a second frame terminal 720 connected to the second external electrode 132.

In addition, the multilayer electronic component 3000 according to the third embodiment of the present disclosure may include conductive adhesive portions 510 and 520 disposed between the external electrodes 131 and 132 and the frame terminals 710 and 720.

The frame terminals 710 and 720 may include connection portions 711 and 721 disposed on the external electrodes 131 and 132 and extending in a first direction, mounting portions 712 and 722 spaced apart from the connection portions 711 and 721 and extending in a second direction, intersecting the first direction, and linking portions 713 and 723 connecting the connection portions 711 and 721 and the mounting portions 712 and 722. That is, the first frame terminal 710 may include a first connection portion 711 disposed on the first external electrode 131 and extending in a first direction, a first mounting portion 712 spaced apart from the first connection portion 711 and extending in a second direction, and a first linking portion 713 connecting the first connection portion 711 and the first mounting portion 712. The second frame terminal 720 may include a second connection portion 721 disposed on the second external electrode 132 and extending in a first direction, a second mounting portion 722 spaced apart from the second connection portion 721 and extending in a second direction, and a second linking portion 723 connecting the second connection portion 721 and the second mounting portion 722.

According to the third embodiment of the present disclosure, the linking portions 713 and 723 may include inner protrusion portions 713*a* and 723*a* protruding inwardly in the second direction, and outer protrusion portions 713*b* and 723*b* connected to the inner protrusion portions 713*a* and 723*a* and protruding outwardly in the second direction. Specifically, the first linking portion 713 may include a first inner protrusion portion 713*a* protruding inwardly in the second direction, and a first outer protrusion portion 713*b* connected to the first inner protrusion portion 713*a* and protruding outwardly in the second direction, and the second linking portion 723 may include a second inner protrusion portion 723*a* protruding inwardly in the second direction, and a second outer protrusion portion 723*b* connected to the second inner protrusion portion 723*a* and protruding outwardly in the second direction.

According to the third embodiment of the present disclosure, the linking portions 713 and 723 securing a space between the multilayer capacitor 100 and the substrate may include inner protrusion portions 713*a* and 723*a* and outer protrusion portions 713*b* and 723*b* protruding in opposite directions, so that the bending strength may be improved more effectively. For example, the inner protrusion portions 713*a* and 723*a* may be connected to the connection portions 711 and 721, and the outer protrusion portions 713*b* and 723*b* may be connected to the mounting portions 712 and 722.

In an embodiment, when a maximum distance between the outer surface of the first external electrode 131 and the outer surface of the second external electrode 132 is defined as L3, and a maximum distance between the first outer protrusion portion 713*b* of the first frame terminal 710 and the second outer protrusion portion 723*b* of the second frame terminal 720 is defined as L4, the maximum distances L3 and L4 may satisfy L4>L3. In addition, considering mounting stability and a mounting area of the multilayer electronic component 3000, L4/L3 may be 1.1 or more and 1.5 or less, but the present disclosure is not limited thereto.

In an embodiment, the inner protrusion portions 713*a* and 723*a* may be concave outwardly in the second direction, and the outer protrusion portions 713*b* and 723*b* may be convex outwardly in the second direction. That is, the inner protrusion portions 713*a* and 723*a* and the outer protrusion portions 713*b* and 723*b* may be bent in opposite directions from, each other, thereby more effectively improving the bending strength of the multilayer electronic component 3000.

In an embodiment, when viewed in a third direction, intersecting the first and second directions, respectively, each of the inner protrusion portions 713*a* and 723*a* and the outer protrusion portions 713*b* and 723*b* may have a semicircular arc shape. The inner protrusion portions 713*a* and 723*a* and the outer protrusion portions 713*b* and 723*b*, which have a semicircular arc shape, have excellent elasticity, so an effect of improving the bending strength may be more significant.

In an embodiment, centers of curvature C1 and C2 of the inner protrusion portions 713*a* and 723*a* and the outer protrusion portions 713*b* and 723*b* may be located outside the body 110 in the second direction. When the centers of curvature C1 and C2 of the inner protrusion portions 713*a* and 723*a* and the outer protrusion portions 713*b* and 723*b* are located outside the body 110 in the second direction, mounting stability of the multilayer electronic component 3000 may be secured.

Meanwhile, in order to secure a distance between the multilayer capacitor 100 and the substrate when mounting the multilayer electronic component 3000 on a substrate, when a maximum size of the body 110 in the first direction is defined as T, and a minimum size between the body 110 and the mounting portions 712 and 722 in the first direction is defined as T2, it may be preferable to satisfy $0.5 \times T \leq T2 \leq 1.5 \times T$.

In addition, it is enough for the mounting portions 712 and 722 to extend in the second and/or third directions to be parallel to the mounting surface in order to function as a terminal when mounted on the substrate, but it may be preferable that the mounting portions 712 and 722 extend inwardly in the second direction from one end of the linking portions 713 and 723. The mounting portions 712 and 722 may extend inwardly in the second direction from one end of the linking portions 713 and 723, thereby reducing the mounting area compared to a structure in which the mounting portions 712 and 722 extend outwardly in the second direction.

FOURTH EMBODIMENT

Figure 10:
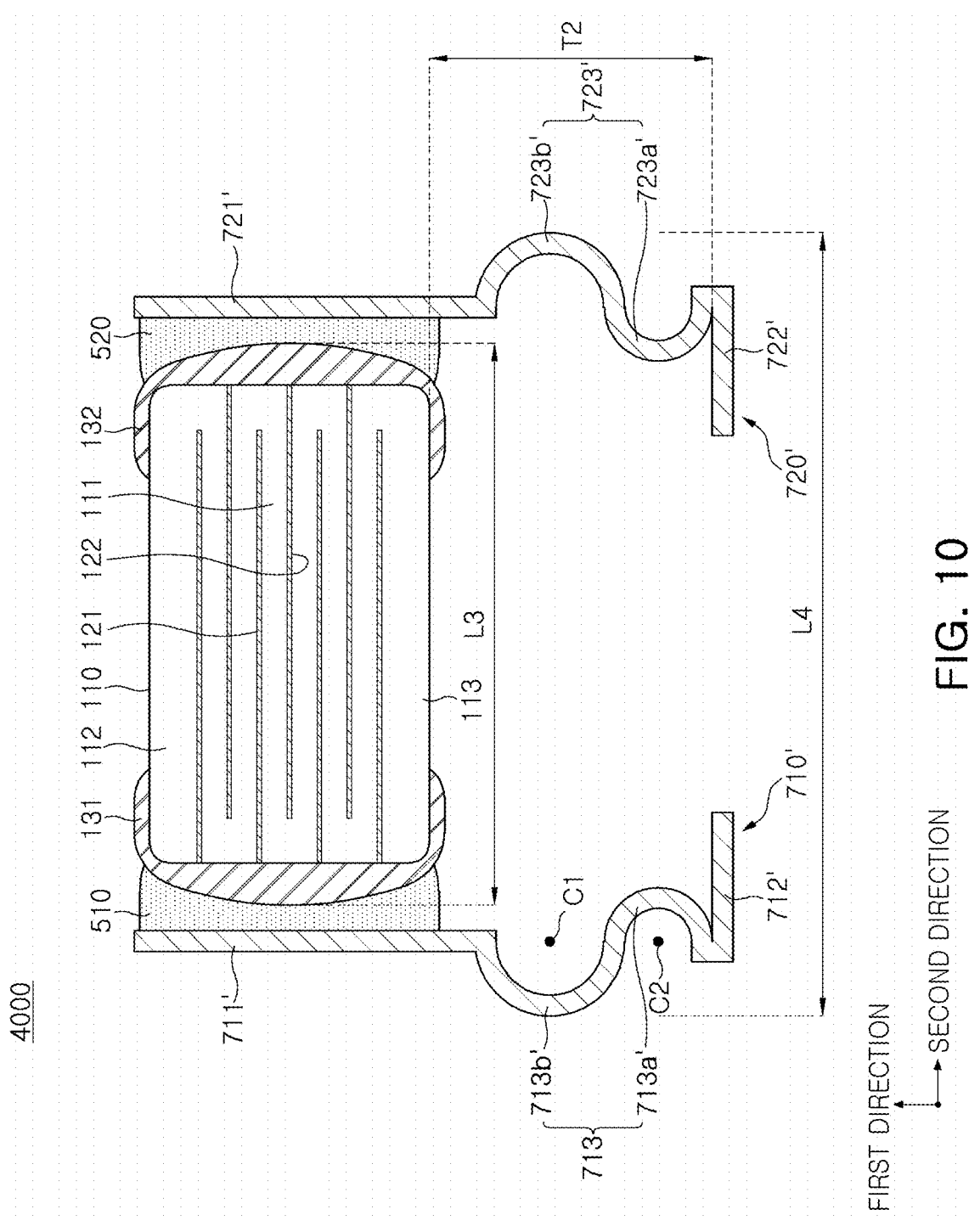
FIG. 10 is a modified example of FIG. 9, and is a cross-sectional view schematically illustrating a multilayer electronic component according to a fourth embodiment of the present disclosure.

FIG. 10 illustrates a modified example of FIG. 9, and is a cross-sectional view schematically illustrating a multilayer electronic component 4000 according to a fourth embodiment of the present disclosure.

Hereinafter, a multilayer electronic component 4000 according to a fourth embodiment of the present disclosure will be described with reference to FIG. 10. Among the components of the multilayer electronic component 4000 according to the fourth embodiment, components similar to those of the first embodiment will be described using the same reference numerals, and description overlapping the description of the first and third embodiments of the present disclosure described above will be omitted.

According to the fourth embodiment of the present disclosure, the frame terminals 710' and 720' may include connection portions 711' and 721' disposed on the external electrodes 131 and 132 and extending in the first direction, mounting portions 712' and 722' spaced apart from the connection portion 711' and 721' and extending in a second direction, intersecting the first direction, and linking portions 713' and 723' connecting the connection portions 711' and 721' and the mounting portions 712' and 722'.

According to the fourth embodiment of the present disclosure, the linking portions 713' and 723' may include inner protrusion portions 713*a*' and 723*a*' protruding inwardly in the second direction and outer protrusion portions 713*b*' and 723*b*' connected to the inner protrusion portions 713*a*' and 723*a*' and protruding outwardly in the second direction.

In the fourth embodiment of the present disclosure, the inner protrusion portions 713*a*' and 723*a*' may be connected to the mounting portions 712 and 722, and the outer protrusion portions 713*b*' and 723*b*' may be connected to the connection portions 711 and 721. The linking portions 713' and 723' securing a distance between the multilayer capacitor 100 and the substrate may include inner protrusion portions 713*a*' and 723*a*' and outer protrusion portions 713*b*' and 723*b*', which protrude in opposite directions, so that the bending strength may be improved more effectively.

As set forth above, as one of the various effects of the present disclosure, a multilayer electronic component having excellent durability against heat or mechanical deformation generated from the substrate may be provided.

While the exemplary embodiments have been shown and described above, it will be apparent to those skilled in the art that modifications and variations could be made without departing from the scope of the present disclosure as defined by the appended claims.

In the present specification, the expression 'an embodiment' used in the present disclosure does not mean the same embodiment, and is provided to emphasize and describe different unique characteristics. However, an embodiment presented above is not excluded from being implemented in combination with features of another embodiment. For example, even if a matter described in one specific embodiment is not described in another embodiment, it can be understood as a description related to another embodiment, unless there is a description contradicting or contradicting the matter in the other embodiment. Terms used in this disclosure are only used to describe one embodiment, and are not intended to limit the disclosure. In this case, singular expressions include plural expressions unless the context clearly indicates otherwise.

In the present disclosure, the meaning of connected is a concept that includes not only directly connected, but also indirectly connected through an adhesive layer, or the like. In addition, the meaning of being electrically connected is a concept including both cases of "physically connected" and "not connected". In addition, expressions such as "first", "second", and the like are used to distinguish one component from another component and do not limit the order and/or importance of the components. In some cases, a first component may be named a second component, and similarly, the second component may be named the first component without departing from the scope of rights.

What is claimed is:

1. A multilayer electronic component, comprising:
a body including a dielectric layer and an internal electrode alternately disposed with the dielectric layer;
an external electrode disposed outside the body; and
a frame terminal including a connection portion disposed on the external electrode and extending in a first direction, a mounting portion spaced apart from the connection portion and extending in a second direction, intersecting the first direction, and a linking portion connecting the connection portion and the mounting portion,
wherein the linking portion includes an inward portion extending inwardly towards the body from one end of the connection portion in the second direction and an outward portion extending outwardly away from the body from one end of the inward portion in the second direction,
wherein, when an angle formed by the inward portion and the outward portion is defined as $\theta$, $\theta$ satisfies $10°<\theta\leq150°$, and
wherein an innermost surface of the linking portion is closer to a free end of the mounting portion than another end of the mounting portion in the second direction.

2. The multilayer electronic component of claim 1, wherein the angle $\theta$ satisfies $60°\leq\theta\leq150°$.

3. The multilayer electronic component of claim 1, wherein the external electrode comprises first and second external electrodes respectively disposed on both surfaces of the body opposing each other in the second direction, and
the frame terminal includes a first frame terminal connected to the first external electrode and a second frame terminal connected to the second external electrode,
wherein, when a maximum distance between an outer surface of the first external electrode and an outer surface of the second external electrode in the second direction is defined as L1, and a minimum distance between the linking portion of the first frame terminal and the linking portion of the second frame terminal in the second direction is defined as L2, L1 and L2 satisfy $L2\geq0.1\times L1$.

4. The multilayer electronic component of claim 1, wherein the inward portion and the outward portion have a curved surface convex inwardly in the second direction.

5. The multilayer electronic component of claim 1, wherein, when a maximum size of the body in the first direction is defined as T, and a minimum distance between the body and the mounting portion in the first direction is defined as T1, T1 satisfies $0.2\times T\leq T1\leq T$.

6. The multilayer electronic component of claim 1, wherein the mounting portion extends inwardly in the second direction from one end of the linking portion.

7. The multilayer electronic component of claim 1, further comprising:
a conductive adhesive portion disposed between the external electrode and the frame terminal.

8. A multilayer electronic component, comprising:
a body including a dielectric layer and an internal electrode alternately disposed with the dielectric layer;
an external electrode disposed outside the body; and
a frame terminal including a connection portion disposed on the external electrode and extending in a first direction, a mounting portion spaced apart from the connection portion and extending in a second direction, intersecting the first direction, and a linking portion connecting the connection portion and the mounting portion,
wherein the linking portion includes an inner protrusion portion protruding inwardly toward the body in the second direction, and an outer protrusion portion connected to the inner protrusion portion and protruding outwardly away from the body in the second direction, and
wherein an innermost surface of the linking portion is closer to a free end of the mounting portion than another end of the mounting portion in the second direction.

9. The multilayer electronic component of claim 8, wherein the inner protrusion portion is concave outwardly in the second direction, and
the outer protrusion portion is convex outwardly in the second direction.

10. The multilayer electronic component of claim 8, wherein the inner protrusion portion is connected to the connection portion, and
the outer protrusion portion is connected to the mounting portion.

11. The multilayer electronic component of claim 8, wherein the inner protrusion portion is connected to the mounting portion, and
the outer protrusion portion is connected to the connection portion.

12. The multilayer electronic component of claim 8, wherein, when viewed in a third direction, intersecting the first and second directions, respectively,
the inner protrusion portion and the outer protrusion portion have a semicircular arc shape.

13. The multilayer electronic component of claim 12, wherein centers of curvatures of the inner protrusion portion and the outer protrusion portion are located further outside than the body in the second direction, respectively.

14. The multilayer electronic component of claim 8, wherein the external electrode comprises first and second external electrodes respectively disposed on both surfaces of the body opposing each other in the second direction, and the frame terminal comprises a first frame terminal connected to the first external electrode and a second frame terminal connected to the second external electrode, wherein a maximum distance between an outer surface of the first external electrode and an outer surface of the second external electrode in the second direction is defined as L3, and a maximum distance between an outer protrusion portion of the first frame terminal and an outer protrusion portion of the second frame terminal in the second direction is defined as L4, L3 and L4 satisfy L4>L3.

15. The multilayer electronic component of claim 8, wherein, when a maximum size of the body in the first direction is defined as T, and a minimum distance between the body and the mounting portion in the first direction is defined as T2, T2 satisfies $0.5 \times T \leq T2 \leq 1.5 \times T$.

16. The multilayer electronic component of claim 8, wherein the mounting portion extends inwardly from one end of the linking portion in the second direction.

17. The multilayer electronic component of claim 8, further comprising:

a conductive adhesive portion disposed between the external electrode and the frame terminal.

18. A multilayer electronic component, comprising:

a body having external electrodes disposed on opposing side surfaces thereof;

frame terminals, each comprising:

a connection portion connected to a corresponding external electrode and extending parallel to a corresponding side surface of the body, a mounting portion disposed away from the body and substantially parallel to a longitudinal surface of the body, and a linking portion disposed between the connection portion and the mounting portion, protruding towards, and/or away from, the body in a longitudinal direction intersecting a plane of the corresponding side surface, an innermost surface of the linking portion is closer to a free end of the mounting portion than another end of the mounting portion in the longitudinal direction, wherein, in the longitudinal direction, a distance between innermost surfaces of linking portions is smaller than a distance between the side surfaces, and/or in the longitudinal direction, a distance between outermost surfaces of linking portions is greater than the distance between the side surfaces.

19. The multilayer electronic component of claim 18, wherein the linking portion includes a first section protruding towards the body in the longitudinal direction, and a second section protruding away from the body in the longitudinal direction, wherein, when an angle formed by the inward portion and the outward portion is defined as θ, θ satisfies $10° \leq θ \leq 150°$.

20. The multilayer electronic component of claim 18, wherein:

the linking portion comprises an inner protrusion portion is connected to the connection portion, and an outer protrusion portion is connected to the mounting portion, and the inner protrusion portion is concave outwardly in the second direction, and the outer protrusion portion is convex outwardly in the second direction.

\* \* \* \* \*